US009329394B2

(12) United States Patent
Lu (10) Patent No.: US 9,329,394 B2
(45) Date of Patent: May 3, 2016

(54) LENS MODULE AND ASSEMBLING METHOD THEREOF

(71) Applicant: HIMAX TECHNOLOGIES LIMITED, Tainan (TW)

(72) Inventor: Yin-Dong Lu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 119 days.

(21) Appl. No.: 14/146,924

(22) Filed: Jan. 3, 2014

(65) Prior Publication Data

US 2015/0192752 A1  Jul. 9, 2015

(51) Int. Cl.
*G02B 9/00* (2006.01)
*G02B 27/02* (2006.01)

(52) U.S. Cl.
CPC ......... *G02B 27/023* (2013.01); *Y10T 29/49826* (2015.01)

(58) Field of Classification Search
CPC .......... G02B 7/023; G02B 7/021; G02B 7/21; G02B 7/0932; G02B 25/002; G02B 23/125; G02B 7/01; G02B 7/102; G02B 7/107
USPC .................................. 359/811–830, 694–706
See application file for complete search history.

(56) References Cited

U.S. PATENT DOCUMENTS

| 6,853,499 B2* | 2/2005 | Iwasaki | G02B 7/023 359/694 |
| 7,173,773 B1* | 2/2007 | Li | G02B 7/10 359/701 |
| 2013/0314810 A1* | 11/2013 | Sekimoto | G02B 7/021 359/823 |

FOREIGN PATENT DOCUMENTS

TW    200912416    3/2009

OTHER PUBLICATIONS

"Office Action of Taiwan Counterpart Application," issued on Dec. 10, 2014, p. 1-p. 8.

* cited by examiner

*Primary Examiner* — Stephone B Allen
*Assistant Examiner* — Rahman Abdur
(74) *Attorney, Agent, or Firm* — J.C. Patents (57) ABSTRACT

A lens module and an assembling method thereof are provided. A lens set includes a barrel and at least one lens disposed inside the barrel. A first position-limiting member is connected to the barrel. A first hollow tube surrounds the barrel and has a first sliding path. The first position-limiting member is configured to slide along the first sliding path before the first hollow tube is fixed so that the barrel is capable of moving with respect to the first hollow tube before the first hollow tube is fixed. The first position-limiting member is limited by the first sliding path. A second hollow tube surrounds the first hollow tube and has a second sliding path. The first position-limiting member is configured to slide along the second sliding path before the first and second hollow tubes are fixed. The second sliding path is inclined to the first sliding path.

15 Claims, 6 Drawing Sheets

LENS MODULE AND ASSEMBLING METHOD THEREOF

BACKGROUND OF THE INVENTION

1. Field of the Invention

The invention generally relates to an optical module and an assembling method thereof and, in particular, to a lens module and an assembling method thereof.

2. Description of Related Art

A lens module is a key component in a camera. The optical quality of a picture shot by the camera is mainly determined by the optical properties of the lens module and an image sensor, for example, a charge-coupled device (CCD) or a complementary metal-oxide-semiconductor (CMOS) sensor.

In the recent years, the camera is integrated into a portable electronic device such as a mobile phone, a smart phone, or a tablet computer. As a result, the size of the lens module is reduced to comply with the requirement for a small size of the portable electronic device.

In a conventional camera in the portable electronic device, there is a single lens in the lens module or are a plurality of lenses arranged on the optical axis of the lens module. That is, the lens module is circularly symmetric. Consequently, the lens module may be fixed on a substrate, on which an image sensor disposed, by screwing. However, in another conventional camera, a lens array is used in the lens module to achieve refocus or stereoscopic imaging. If the lens module containing the lens array is screwed to the substrate to a certain appropriate focusing position, the orientation relationship between the lens module and the image sensor will be not correct since the lens module is not circularly symmetric and is rotated with respect to the image sensor when screwing.

SUMMARY OF THE INVENTION

Accordingly, the invention is directed to a lens module. The focus of lens set in the lens module may be adjusted without rotating the lens set.

The invention is directed to an assembling method of a lens module, which may adjust the focus of the lens set without rotating the lens set.

According to art embodiment of the invention, a lens module including a lens set, a first position-limiting member, a first hollow tube, and a second hollow tube is provided. The lens set includes a barrel and at least one lens disposed inside the barrel. The first position-limiting member is connected to a side surface of the barrel. The first hollow tube surrounds the barrel and has a first sliding path, wherein the first position-limiting member is configured to slide along the first sliding path before the first hollow tube is fixed so that the barrel is capable of moving with respect to the first hollow tube before the first hollow tube is fixed, and the first position-limiting member is limited by the first sliding path. The second hollow tube surrounds the first hollow tube and has a second sliding path. The first position-limiting member is configured to slide along the second sliding path before the first and second hollow tubes are fixed. The second sliding path is inclined to the first sliding path. When the second hollow tube rotates, the second slide path causes the first position-limiting member to slide along the first and second sliding paths, so that the barrel is moved along a direction substantially parallel to an optical axis of the barrel.

According to an embodiment of the invention, an assembling method of a lens module is provided. The assembling method includes: putting a lens set into an adjustment mechanism; rotating the adjustment mechanism to translate the lens set without rotation of the lens set; and fixing the lens set and the adjustment mechanism.

In the lens module according to the embodiment of the invention, since the barrel is moved along a direction substantially parallel to an optical axis of the barrel, the focus of the lens set in the lens module may be adjusted without rotating the lens set. In addition, in the assembling method of the lens module according to the embodiment of the invention, the adjustment mechanism is rotated to translate the lens set without the rotation of the lens set, so that the focus of the lens set may be adjusted without rotating the lens set.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1A:
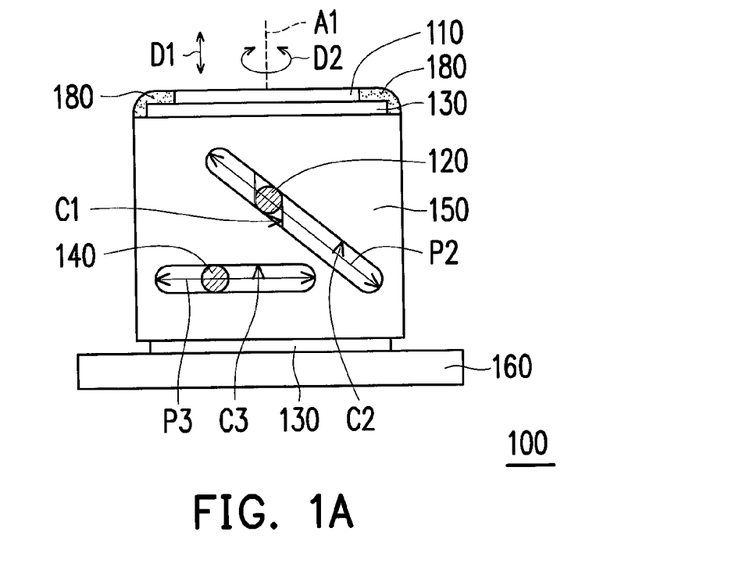
FIG. 1A is a schematic side view of a lens module according to an embodiment of the invention.
Figure 1B:
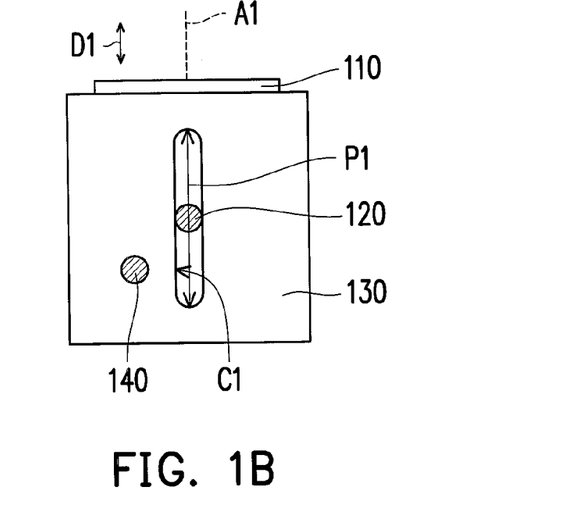
FIG. 1B is a schematic side view of the lens set, the first hollow tube, the first position-limiting member, and the second position-limiting member in FIG. 1A.
Figure 1C:
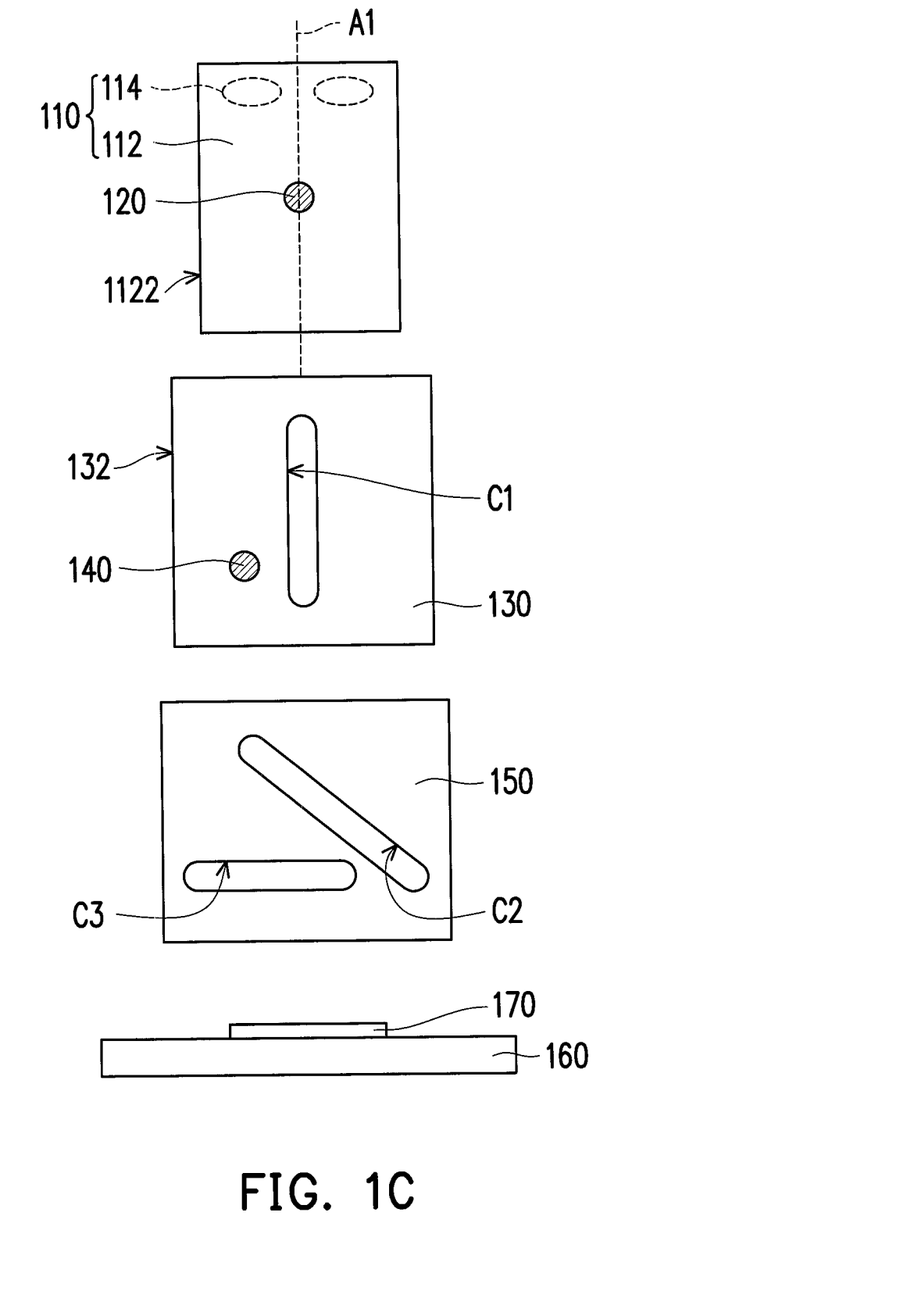
FIG. 1C is a schematic exploded view of the lens module in FIG. 1A.
Figure 2:
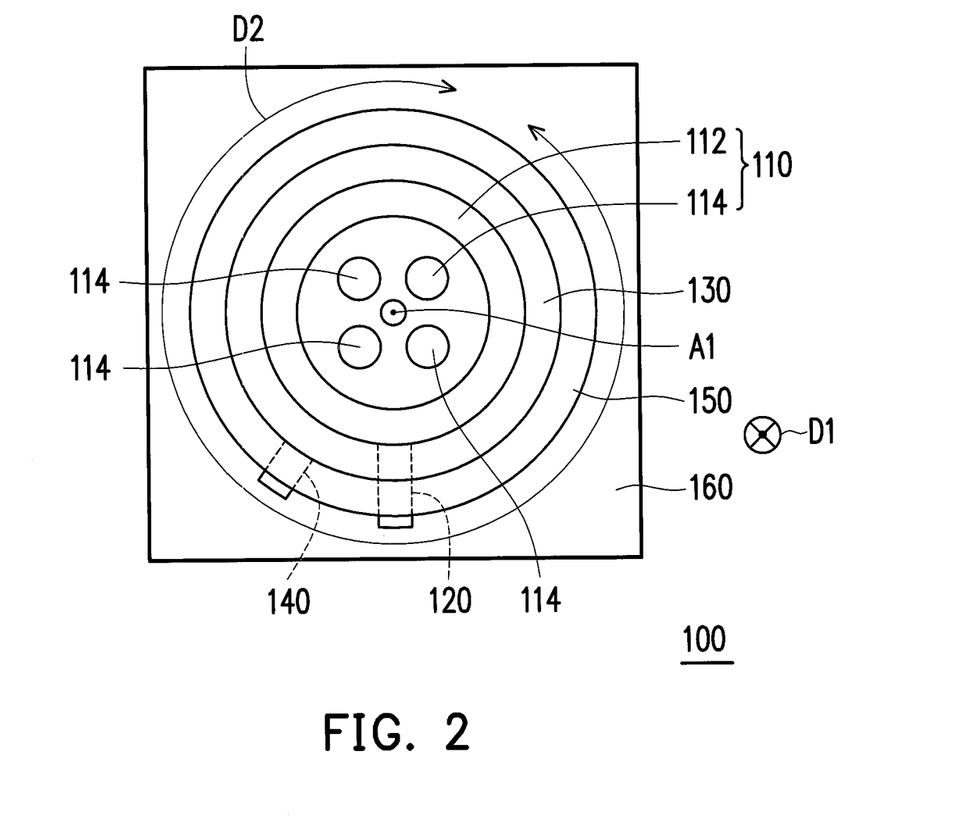
FIG. 2 is a schematic top view of the lens module in FIG. 1A.

FIG. 1A is a schematic side view of a lens module according to an embodiment of the invention, FIG. 1B is a schematic side view of the lens set, the first hollow tube, the first position-limiting member, and the second position-limiting member in FIG. 1A, and FIG. 1C is a schematic exploded view of the lens module in FIG. 1A. FIG. 2 is a schematic top view of the lens module in FIG. 1A. Referring to FIGS. 1A to 1C, the lens module 100 of this embodiment includes a lens set 110, a first position-limiting member 120, a first hollow tube 130, and a second hollow tube 150. The lens set 110 includes a barrel 112 and at least one lens 114 (a plurality of lenses 114 are shown in FIGS. 1C and 2) disposed inside the barrel 112. In this embodiment, the lenses 114 are arranged in an array.

The first position-limiting member 120 is connected to a side surface 1122 of the barrel 112. In this embodiment, the barrel 112 is cylindrical-shaped. In addition, the first hollow tube 130 surrounds the barrel 112 and has a first sliding path P1. The first position-limiting member 120 is configured to slide along the first sliding path P1 before the first hollow tube 130 is fixed so that the barrel 112 is capable of moving with respect to the first hollow tube 130 (e.g. translating along a first direction D1 substantially parallel to the optical axis A1 of the lens set 110) before the first hollow tube is fixed, and the first position-limiting member 120 is limited by the first sliding path P1. In this embodiment, the first position-limiting member 120 is a protrusion or a bolt on the side surface 1122 of the barrel 112, and the first sliding path P1 is formed by a channel C1 into which the first position-limiting member 120 protrudes. In this embodiment, the lens module 100 further includes a substrate 160, and the first hollow tube 130 is connected to the substrate 160. For example, the first hollow tube 130 is fixed on the substrate 160. An image sensor 170 may be disposed on the substrate 160, and the substrate 160 is, for example, a printed circuit board (PCB). The image sensor 170 is, for example, a charge-coupled device (CCD) or a complementary metal-oxide-semiconductor (CMOS) sensor.

The second hollow tube 150 surrounds the first hollow tube 130 and has a second sliding path P2. The first position-limiting member 120 is configured to slide along the second sliding path P2 before the first and second hollow tubes 130, 150 are fixed. The second sliding path P2 is inclined to the first sliding path P1. In this embodiment, the first sliding path is substantially parallel to the optical axis A1 of the lens set 110 (i.e. the optical axis A1 of the barrel 112). When the second hollow tube 150 rotates (for example, the second hollow tube 150 rotates along a second direction D2 and the optical axis A1 serves as a rotation axis of the rotation of the second hollow tube 150), the second slide path P2 causes the first position-limiting member 120 to slide along the first and second sliding paths P1, P2, so that the barrel 112 is moved along the first direction D1 substantially parallel to the optical axis A1 of the barrel 112. In this embodiment, the first hollow tube 130 and the second hollow tube 150 are cylindrical-shaped, so that the second sliding path P2 is arc-shaped. In this embodiment, the second sliding path is formed by a channel C2. In this embodiment, the first channel C1 extends along a direction substantially parallel to the optical axis A1, and the channel C2 is inclined to the channel C1.

Specifically, when the second hollow tube 150 is rotated counterclockwise, the channel C2 forces the first position-limiting member 120 to move upwards along the channel C1, so that the barrel 112 is moved upwards along the first direction D1. On the other hands, when the second hollow tube 150 is rotated clockwise, the channel C2 forces the first position-limiting member 120 to move downwards along the channel C1, so that the barrel 112 is moved downwards along the first direction D1.

In the lens module 100 in this embodiment, since the barrel 112 is moved along the direction substantially parallel to the optical axis A1 of the barrel 112, the focus of the lens set 110 (or the distance between the lenses 114 and the image sensor 170) in the lens module 100 may be adjusted without rotating the lens set 110. As a result, the orientation relationship between the lens array formed by the lenses 114 and the image sensor 170 is not affected when adjusting the focus. Therefore, the lens module is a lens module having a lens array and achieving good optical properties.

In this embodiment, the lens module 100 further includes a second position-limiting member 140 connected to a side surface 132 of the first hollow tube 130. The second hollow tube 150 has a third sliding path P3. The second position-limiting member 140 is configured to slide along the third sliding path P3 before the first hollow tube 130 and the second hollow tube 150 are fixed. The third sliding path P3 limits the moving distance of the second position-limiting member 140 so as to limit the rotation angle of the second hollow tube 150 and thus limit the moving distance (i.e. the translating distance along the first direction D1) of the barrel 112 along the direction substantially parallel to the optical axis A1 of the barrel 112. Since the second hollow tube 150 is cylindrical-shaped, the third sliding path P3 is arc-shaped.

In this embodiment, the second position-limiting member 140 is a protrusion or a bolt on the side surface 132 of the first hollow tube, and the third sliding path P3 is formed by a channel C3 into which the second position-limiting member 140 protrudes. The channel C3 is, for example, arc-shaped. In other embodiments, the lens module 100 may not include the channel C3, the third sliding path P3, and the second position-limiting member 140, and the moving distance (i.e. the translating distance along the first direction D1) of the barrel 112 is limited by the length of the channel C1 or the length of the channel C2.

In this embodiment, the lens module 100 further includes an adhesive member 180 configured to fix the barrel 112, the first hollow tube 130, and the second hollow tube 150 together, so that the distance between the lenses 114 and the image sensor 170 is fixed. When an image is well focused by the lens set 110 on the image sensor 170, the adhesive member 180 may be used to fix the barrel 112, the first hollow tube 130, and the second hollow tube 150 together.

Figure 3A:
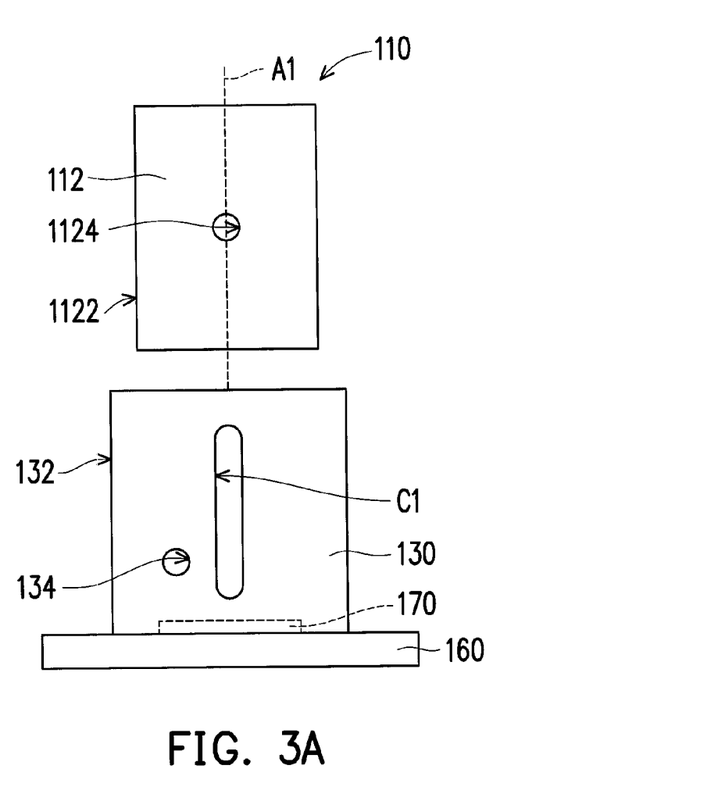
FIGS. 3A to 3E are schematic side views showing the steps of an assembling method of a lens module according to an embodiment of the invention.
Figure 3B:
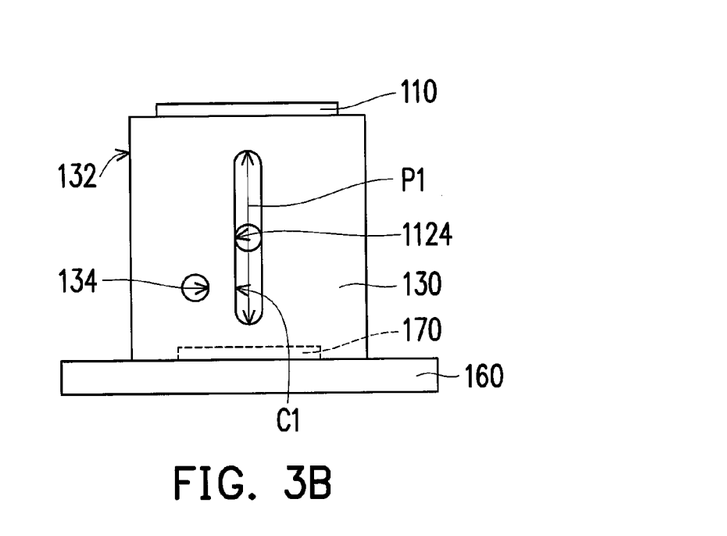
Figure 3C:
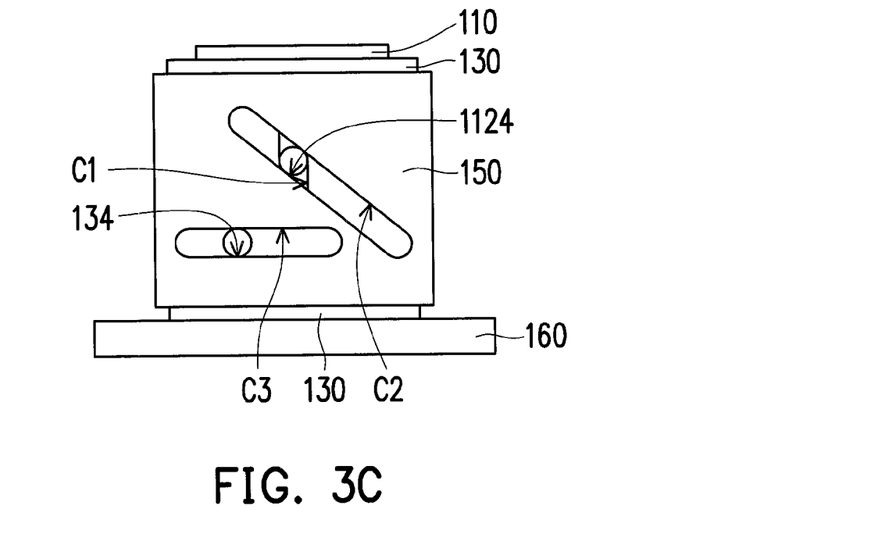
Figure 3D:
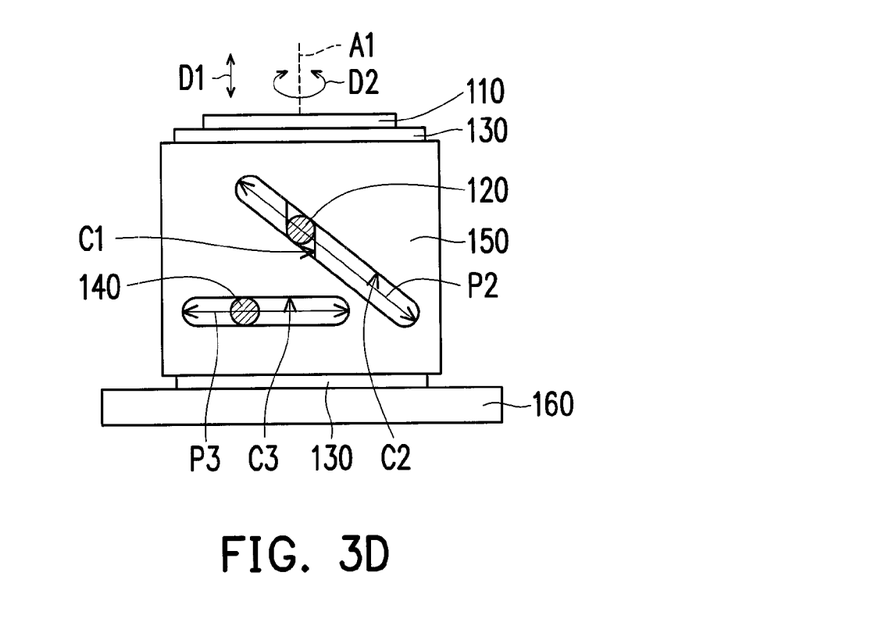

FIGS. 3A to 3E are schematic side views showing the steps of an assembling method of a lens module according to an embodiment of the invention. Referring to FIGS. 3A to 3E, the assembling method of a lens module in this embodiment may be used to assemble the lens module 100 in FIG. 1A. The assembling method includes the following steps. First, as shown in FIG. 3A, the first hollow tube 130 is disposed on the substrate 160. For example, the first hollow tube 130 is fixed on the substrate 160. Then, as shown in FIGS. 3B to 3D, the lens set 110 is put into an adjustment mechanism, wherein the adjustment mechanism in this embodiment includes the first position-limiting member 120, the first hollow tube 130, the second hollow tube 150, and the second position-limiting member 140. Specifically, the step of putting the lens set 110 into the adjustment mechanism includes the following steps. First, as shown in FIG. 3B, the barrel 112 is put into the first hollow tube 130. Next, as shown in FIG. 3C, the first hollow tube 130 is put into the second hollow tube 150.

In this embodiment, then, as shown in FIG. 3D, the first position-limiting member 120 is fixed on the side surface 1122 of the barrel 112 after the barrel 112 is put into the first hollow tube 130 and after the first hollow tube 130 is put into the second hollow tube 150. The first position-limiting member 120 may be inserted through the channels C1 and C2 to fix on the side surface 1122 of the barrel 112. For example, the first position-limiting member 120 is a bolt, and the bolt is screwed into the hole 1124 at the side surface 1122. However, in other embodiment, the first position-limiting member 120 may be a protrusion, and the protrusion and the barrel 112 are integrally formed.

In this embodiment, the second position-limiting member 140 is connected to the side surface 132 of the first hollow tube 130. The second position-limiting member 140 may be a bolt which is inserted into the channel C3 and is screwed into the hole 134 at the side surface 132 after first hollow tube 130 is put into the second hollow tube 150. However, in other embodiments, the second position-limiting member 140 may be a protrusion, and the protrusion and the first hollow tube 130 are integrally formed.

Figure 3E:
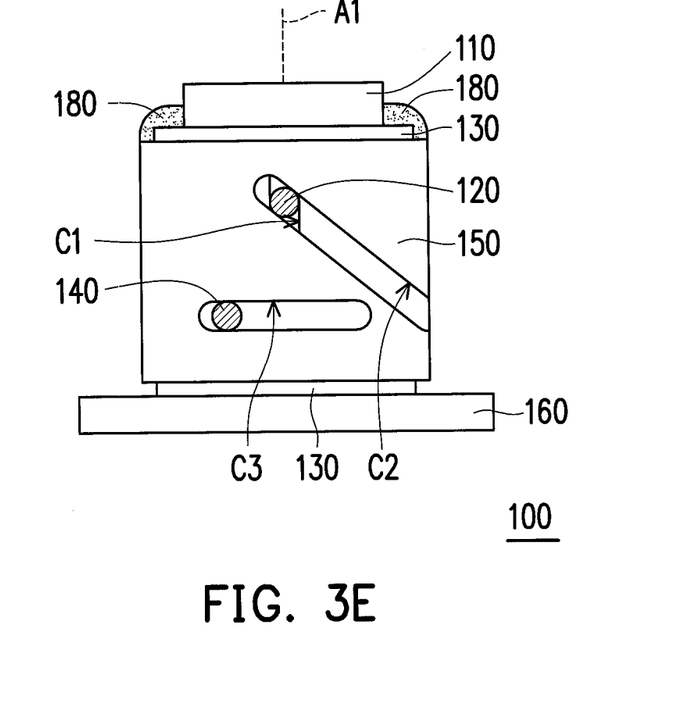

Afterwards, as shown in FIGS. 3D and 3E, the adjustment mechanism is rotated to translate the lens set 110 without rotation of the lens set 110. Specifically, in this embodiment, the step of rotating the adjustment mechanism to translate the lens set 110 without rotation of the lens set 110 includes rotating the second hollow tube 150 so that the second slide path P2 causes the first position-limiting member 120 to slide along the first and second sliding paths P1, P2, so that the barrel 112 is moved along a direction substantially parallel to an optical axis A1 of the barrel 112.

Then, as shown in FIG. 3E, the lens set 110 and the adjustment mechanism are fixed. Specifically, in this embodiment, whether an image is focused by the lens set 110 on the image sensor 170 or not is determined when rotating the adjustment mechanism to translate the lens set 110 without the rotation of the lens set 110. If the image is focused on the image sensor 170, the barrel 112, the first hollow tube 130, and the second hollow tube 150 are fixed. For example, the barrel 112, the first hollow tube 130, and the second hollow tube 150 are fixed together by the adhesive member 180.

In the assembling method of the lens module in this embodiment, the adjustment mechanism is rotated to translate the lens set 110 without the rotation of the lens set, so that the focus of the lens set 110 may be adjusted without rotating the lens set 110. As a result, the orientation relationship between the lenses 110 and the image sensor 170 are not affected when adjusting the focus, so that the assembling method may assemble the lens module 100 with good optical properties.

In the lens module according to the embodiment of the invention, since the barrel is moved along a direction substantially parallel to an optical axis of the barrel, the focus of the lens set in the lens module may be adjusted without rotating the lens set. In addition, in the assembling method of the lens module according to the embodiment of the invention, the adjustment mechanism is rotated to translate the lens set without the rotation of the lens set, so that the focus of the lens set may be adjusted without rotating the lens set.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. A lens module comprising:
   a lens set comprising a barrel and at least one lens disposed inside the barrel;
   a first position-limiting member connected to a side surface of the barrel;
   a first hollow tube surrounding the barrel and having a first sliding path, wherein the first position-limiting member is configured to slide along the first sliding path before the first hollow tube is fixed so that the barrel is capable of moving with respect to the first hollow tube before the first hollow tube is fixed, and the first position-limiting member is limited by the first sliding path;
   a second hollow tube surrounding the first hollow tube and having a second sliding path, wherein the first position-limiting member is configured to slide along the second sliding path before the first and second hollow tubes are fixed, the second sliding path is inclined to the first sliding path, and wherein when the second hollow tube rotates, the second slide path causes the first position-limiting member to slide along the first and second sliding paths, so that the barrel is moved along a direction substantially parallel to an optical axis of the barrel; and
   an adhesive member being configured to fix the barrel, the first hollow tube and the second hollow tube together.

2. The lens module according to claim 1 further comprising a substrate, wherein the first hollow tube is connected to the substrate.

3. The lens module according to claim 1, wherein the first position-limiting member is a protrusion or a bolt on the side surface of the barrel, and the first sliding path and the second sliding path are respectively formed by channels into which the first position-limiting member protrudes.

4. The lens module according to claim 1 further comprising a second position-limiting member connected to a side surface of the first hollow tube, wherein the second hollow tube has a third sliding path, the second position-limiting member is configured to slide along the third sliding path before the first hollow tube and the second hollow tube are fixed, the third sliding path limits a moving distance of the second position-limiting member so as to limit a rotation angle of the second hollow tube and thus limit a moving distance of the barrel along the direction substantially parallel to the optical axis of the barrel.

5. The lens module according to claim 4, wherein the second position-limiting member is a protrusion or a bolt on the side surface of the first hollow tube, and the third sliding path is formed by a channel into which the second position-limiting member protrudes.

6. The lens module according to claim 1, wherein the at least one lens is a plurality of lenses arranged in an array.

7. The lens module according to claim 1, wherein the first sliding path is substantially parallel to the optical axis of the barrel.

8. An assembling method of a lens module comprising:
   putting a lens set into an adjustment mechanism, wherein the lens set comprises a barrel and at least one lens disposed inside the barrel, the adjustment mechanism comprises a first hollow tube and a second hollow tube, and putting the lens set into the adjustment mechanism comprising:
   disposing the first hollow tube on a substrate;
   putting the barrel into the first hollow tube, wherein the first hollow tube has a first sliding path, a first position-limiting member is located on a side surface of the barrel and configured to slide along the first sliding path so that the barrel is capable of moving with respect to the first hollow tube, and the first position-limiting member is limited by the first sliding path; and
   putting the first hollow tube into the second hollow tube, wherein the second hollow tube has a second sliding path, the first position-limiting member is configured to slide along the second sliding path, the second sliding path is inclined to the first sliding path, and wherein when the second hollow tube rotates, the second slide path causes the first position-limiting member to slide along the first and second sliding paths, so that the barrel is moved along a direction substantially parallel to an optical axis of the barrel;
   rotating the adjustment mechanism to translate the lens set without rotation of the lens set; and
   using an adhesive member to fix the lens set and the adjustment mechanism, wherein the adhesive member fixes the barrel, the first hollow tube and the second hollow tube together.

9. The assembling method of the lens module according to claim 8, wherein the les set comprising a plurality of lenses arranged in an array.

10. The assembling method of the lens module according to claim 8, wherein the first position-limiting member is fixed on the side surface of the barrel after the barrel is put into the first hollow tube and after the first hollow tube is put into the second hollow tube, the first sliding path and the second sliding path are respectively formed by channels, and the first position-limiting member is inserted through the channels to fix on the side surface of the barrel.

11. The assembling method of the lens module according to claim 8, wherein a second position-limiting member is connected to a side surface of the first hollow tube, the second hollow tube has a third sliding path, the second position-limiting member is configured to slide along the third sliding path, the third sliding path limits a moving distance of the second position-limiting member so as to limit a rotation angle of the second hollow tube and thus limit a moving distance of the barrel along the direction substantially parallel to the optical axis of the barrel.

12. The assembling method of the lens module according to claim 11, wherein the second position-limiting member is a protrusion or a bolt on the side surface of the first hollow tube, and the third sliding path is formed by a channel into which the second position-limiting member protrudes.

13. The assembling method of the lens module according to claim 8, wherein first position-limiting member is a protrusion or a bolt.

14. The assembling method of the lens module according to claim 8, wherein rotating the adjustment mechanism to translate the lens set without rotation of the lens set comprises:
   rotating the second hollow tube so that the second slide path causes the first position-limiting member to slide along the first and second sliding paths, so that the barrel is moved along a direction substantially parallel to an optical axis of the barrel.

15. The assembling method of the lens module according to claim 8, wherein an image sensor is disposed on the substrate, and the assembling method further comprises:
   determining whether an image is focused by the lens set on the image sensor or not when rotating the adjustment mechanism to translate the lens set without the rotation of the lens set, wherein if the image is focused on the image sensor, the barrel, the first hollow tube, and the second hollow tube are fixed.

* * * * *